United States Patent [19]

McMann, Jr.

[11] 3,715,465

[45] Feb. 6, 1973

[54] APPARATUS FOR DEVELOPING SIMULTANEOUS COLOR TELEVISION SIGNALS INCLUDING A STRIPED COLOR FILTER CONSTRUCTED TO GENERATE A PILOT SIGNAL FOR COMPONENT VIDEO SIGNAL SEPARATION

[76] Inventor: Renville H. McMann, Jr., 27 Whitney Avenue, New Canaan, Conn. 06840

[22] Filed: April 23, 1971

[21] Appl. No.: 136,895

Related U.S. Application Data

[63] Continuation-in-part of Ser. No. 829,038, May 29, 1969, abandoned.

[52] U.S. Cl..........178/5.4 ST, 178/5.4 C, 178/5.4 CF

[51] Int. Cl...............................................H04n 9/06

[58] Field of Search........178/5.2 R, 5.4 R, 5.4 ST, 5.4 CF, 178/5.4 C

[56] References Cited

UNITED STATES PATENTS

| | | | |
|---|---|---|---|
| 3,510,575 | 5/1970 | Dillenburger et al. | 178/5.4 ST |
| 3,496,286 | 2/1970 | Chmillon | 178/5.4 ST |
| 2,843,659 | 7/1958 | James | 178/5.4 ST |

*Primary Examiner*—Robert L. Griffin
*Assistant Examiner*—George G. Stellar
*Attorney*—Spencer E. Olson

[57] ABSTRACT

As described herein, a chrominance television signal containing separable color component portions, together with a square wave pilot signal, and a luminance signal are developed either successively by a singular scanning device operating in conjunction with a suitable optical filtering arrangement or simultaneously by a pair of scanning devices also operating in conjunction with a suitable optical filtering arrangement. The pilot signal is separated from the color component portions of the chrominance television signal and then employed to separate the color component portions. Where the chrominance signal and the luminance signal are developed successively, the separated color component portions and the luminance signal are alternately delayed for selected periods of time to align in time the luminance signal and the color component portions. Thereafter, the luminance signal and the color component portions of the chrominance signal are combined to produce conventional NTSC luminance and chrominance signals.

16 Claims, 3 Drawing Figures

INVENTOR.
RENVILLE H. McMANN, JR.

ATTORNEY

INVENTOR.
RENVILLE H. McMANN, JR.

ATTORNEY

INVENTOR
RENVILLE H. McMANN, JR.

Spencer E. Olson

ATTORNEY

APPARATUS FOR DEVELOPING SIMULTANEOUS COLOR TELEVISION SIGNALS INCLUDING A STRIPED COLOR FILTER CONSTRUCTED TO GENERATE A PILOT SIGNAL FOR COMPONENT VIDEO SIGNAL SEPARATION

REFERENCE TO OTHER APPLICATION

This application is a continuation-in-part of co-pending application Ser. No. 829,038 filed May 29, 1969 now abandoned, assigned to the assignee of the present application.

BACKGROUND OF THE INVENTION

This invention relates to color television apparatus, and, more particularly, to color television systems employing at least one scanning device to derive simultaneous color signals.

In an attempt to overcome the electrical and optical misregistration problems inherent in most conventional three pick-up tube color television systems, systems have been devised which employ one or two special pick-up tubes to derive simultaneous color signals. In systems employing a singular pick-up tube, one signal is derived which contains separable portions corresponding to the three primary color components of the scanned object field and a further portion interspersed throughout the signal which operates as a reference level signal and enables the different color portions to be separated. In systems employing two pick-up tubes, one pick-up tube is employed to derive a monochrome or luminance signal and another pick-up device is employed to derive a color signal containing separable color portions and reference portions interspersed throughout the color signal.

Systems of the above-mentioned type have not met with substantial commercial success inasmuch as the separable reference portions of the derived color signal have heretofore not been effectively employed to sample the color signal so as to effect the accurate separation of the separable color portions of the derived signal into simultaneous color signals. This has resulted in a color overlap, the commingling of the different primary color portions and the generation of distorted luminance and chrominance signals. Moreover, the inclusion of separable reference portions in the color signal necessarily reduces the effective bandwidths of the color portions of the color signal.

SUMMARY OF THE INVENTION

Accordingly, it is an object of the present invention to provide a color television system employing at least one scanning device to derive simultaneous color signals which overcomes the above-mentioned disadvantages of the prior art.

It is another object of the present invention to provide a color television system of the above-mentioned type wherein a pilot signal is developed to accurately sample the color signal so as to provide accurate color separation between the different color component portions of the signal.

These and other objects of the invention are accomplished by providing a color television system which comprises optical color filter means for selectively transmitting different color light components of an object field and for periodically varying the intensity of the selectively transmitted color component light. An input means is provided which is responsive to the transmitted light and develops color television signals containing separable color component portions and a pilot signal. A decoding circuit is further provided and includes a filter network for separating the pilot signal from the separable color component portions and a gating network which is selectively scanned by the pilot signal for separating the separable color component portions. Preferably, the color filter means further provides for the transmission of all the object field light and the input means in responsive to the transmitted light for developing a luminance signal. Thereafter, the luminance signal is combined with the separated color component portions to produce standard luminance and chrominance signals.

In one embodiment of the invention, the color television signal and the luminance signal are developed successively by the input means and the separated color component portions and the luminance signal are alternately delayed for selected periods of time to thereby coincidentally align the signals. In another embodiment of the invention, the color television signal and the luminance signal are developed simultaneously.

DESCRIPTION OF THE PREFERRED EMBODIMENT

Figure 1:
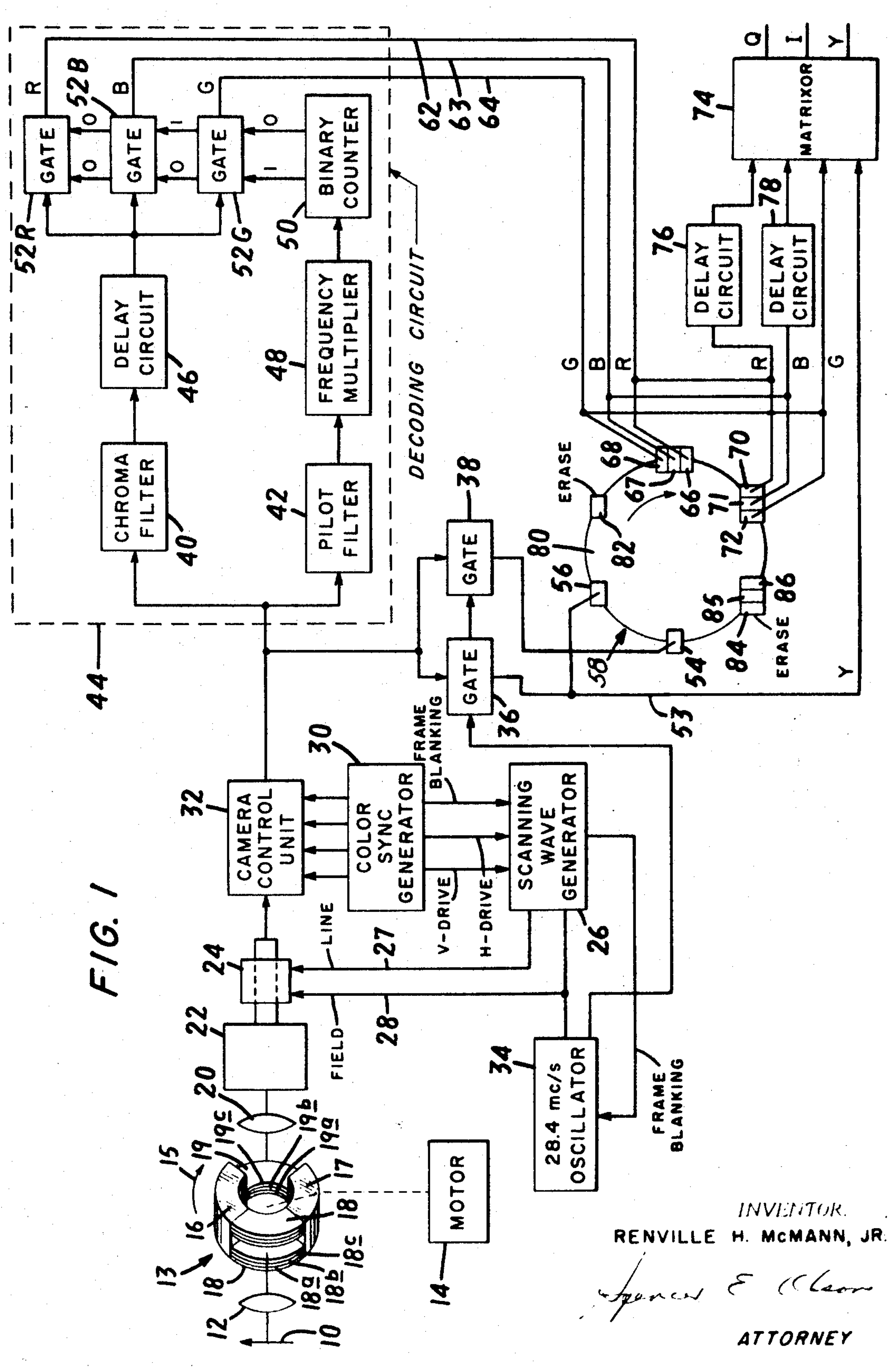
FIG. 1 is a schematic block diagram illustrating the arrangement of one embodiment of the present invention.

In a representative color television system arranged according to the present invention, as shown in FIG. 1, light from an object field 10 is collected by a lens 12 and directed to a filter disc 13 driven by a servo-controlled motor 14 at a constant angular velocity which may be, for example, 15 revolutions per second, in the direction indicated by the arrow 15. As shown, the filter disc 13 comprises two angularly spaced transparent segments or quadrants 16 and 17 and two angularly spaced strip filters 18 and 19 interposed between the transparent segments. For a disc rotation of 15 revolutions a second, the transparent segments 16 and 17 and the color strip filters 18 and 19 are interposed successively in the path of the object field light every one-sixtieth of a second. The strip filter 18 comprises a plurality of axially spaced filter sets (only two of which are illustrated), each set consisting of successive red, blue and green filter strips **18*a*, 18*b*, 18*c* which completely and selectively transmit the red, blue and green color components, respectively, of the object object field light. As shown, the space between two sets is the same as the axial dimension of each set, and the others are similarly spaced. The strip filter 19 comprises a plurality of spaced filter sets (only one of which is shown), each set consisting of successive red, blue and green vertical filter strips 19a, 19b and 19c, respectively, which are partially transmissive, for example, eighty percent transmissive, and selectively transmit the red, blue and green color components of the object field light. Successive ones of the plurality of filter sets of filter 19** are also spaced apart in the axial direction by the width of a filter set.

Preferably, the spaced filter sets forming the strip filter 18 are optically aligned and superimposed on the spaces between the filter sets forming the strip filter 19. In this manner, the intensity of the object light transmitted by the strip filters 18 and 19 varies between full intensity and partial intensity as a function of the number of filter sets. Preferably, each of the color strip filters 18 and 19 comprise approximately 150 filter sets. For a line scansion frequency of nominally 15,750 cycles per second, the time taken to scan each line completely is 63.5 microseconds and, because of the interposition of filter sets, the time taken to scan each picture element in a particular primary color is [63.5/150C3) (2)] or 0.07 microseconds. It will be noted therefore that each 0.07 microsecond segment of a color video signal developed while the strip filters 18 and 19 are placed in the path of the incident object light will contain information corresponding to a different primary color component of the object field 10. Furthermore, because of the alternate spacing of the filter sets of the color strip filters 18 and 19, a square wave pilot signal having a frequency equal to one-half the color signal frequency or approximately 2.36 megacycles per second (mc/s) will be developed.

The light transmitted through the transparent segments 16 and 17 and representing the brightness of the object field 10 or the light transmitted by the color strip filters representing the color components of the object field 10 is focused by a relay lens 20 onto the light sensitive surface of a scanning device 22. The scanning beam in the device 22 is deflected in the line and field directions by a suitable scanning yoke 24 energized with suitable line and field sawtooth waves generated by a scanning wave generator 26 and supplied to the scanning yoke by way of conductors 27 and 28, respectively. A color synchronizing generator 30 generates the suitable vertical and horizontal drive pulses which are applied to the scanning wave generator and to a camera control unit 32 associated with the camera tube 22. The relationship between the horizontal and vertical drive pulses is selected to yield a 525-line, double-interlaced picture in accordance with conventional television standards and, more particularly, a vertical drive signal having a frequency of nominally 60 cycles and a horizontal drive signal having a frequency of 15,750 cycles are provided.

The synchronizing generator 30 also develops composite blanking and composite sync signals in the usual manner, the composite blanking and composite sync signals being supplied to the camera control unit 32. Also developed by the color sync generator are frame blanking signals which occur every other field scansion and are generated at the same time the transparent segments 16 and 17 of the disc 13 are situated between the object field 10 and the scanning device 22. These signals are supplied by way of the scanning wave generator 26 to a 28.4 mc/s oscillator 34 which is energized by the signals and emits a 28.4 mc/s sine wave. The output terminal of the oscillator 34 is coupled to the conductor 28 such that every other field scansion the field deflecting sawtooth wave supplied by the generator 26 is modulated by the high frequency sine wave emitted by the oscillator 34.

The modulation of the field deflection sawtooth waves causes a proportional variation in the magnetic lines of force which extend horizontally through the yoke 24 and the scanning spot in the camera is correspondingly varied in vertical position. It is necessary that the peak-to-peak amplitude of the generated sine wave be sufficient to produce a corresponding sinusoidal variation in the motion of the scanning spot, the spot motion comprising a peak-to-peak value which equals the distance between the lines of the alternate even and odd fields. As may be understood, it is in this manner that a frame signal corresponding to the brightness of the object field is developed every other field scansion.

The frequency of the sine wave generated by the oscillator 34 represents a multiple of the maximum number of picture elements reproducible each second in a conventional television system. Since the maximum number of elements along any line of a field is approximately 450, 28.4 mc/s represents the product of the line scansion frequency (15,750 cps), the maximum number of picture elements (450) and the integer 4. It should be understood, however, that any frequency greater than the minimum frequency of 7.1 mc/s ($15,750 \times 450$) may be used equally as well to accomplish the discharge of the picture elements along the even and odd lines of the same field to thereby provide a frame signal.

The brightness and the chrominance (chroma) signals developed successively by the scanning device 22 are coupled to the camera control unit 32 and combined therein with the composite line and field blanking waves supplied from the generator 30. From the unit 32, the signals are supplied to a pair of gate circuits 36 and 38 and to a bandpass chroma filter 40 and a bandpass pilot filter 42 located in a chroma decoding circuit 44.

The gates 36 and 38 may be of conventional types and, accordingly, in response to two or more signals of proper phase and amplitude applied to their respective input terminals, pass signals representative of one of the applied input signals. Coupled to the other input terminals of the gate circuits is the output of the oscillator 34. The gates are constructed such that the positive going portions of the high frequency sine wave generated by the oscillator 34 enable the gate circuit 36 while the negative going portions of the sine wave generated by the oscillator 34 enable the gate circuit 38. Accordingly, the gates 36 and 38 with suitable delay means (to be described) respectively produce the line portions of alternate even and odd fields and together transmit a brightness frame signal Y.

In the chroma decoding circuit 44, the red, blue and green color component signals and the square wave pilot signal are separated by the two bandpass filters 40 and 42 and supplied along separate conductors to a delay circuit 46 and to a frequency multiplier circuit 48, respectively. The multiplier 48, which may be of conventional construction, increases the periodicity of the developed pilot signal by a factor of six such that one cycle of the pilot occurs in the period of time it takes to scan one picture element, viz. 0.07 microseconds. Thereupon, the pilot signal is supplied to a binary counter 50 comprising, for example, two flip-flop circuits. In response to the positive half cycles of the pilot signal, the counter 50 steps sequentially to a count of 2 before being reset to 0.

The output terminals of the two stages composing the counter are selectively connected to the input terminals of three gate circuits labelled 52G, 52B and 52R, respectively. The other input terminals of the gates 52G, 52B and 52R are connected together and to the output terminal of the delay circuit 46. As shown, the gate circuit 52R is enabled when the counter 50 is reset to a count of 0 to transmit the red color component of the chroma signal, the gate 52B is enabled when the counter 50 is stepped to a count of 1 to transmit the blue color component of the chroma signal and the gate 52G is enabled when the counter 50 is stepped to a count of 2 to transmit the green color component signal.

The output terminal of the gate circuit 36 and the output of a read magnetic head 56 of a magnetic disk recorder 58 are both coupled to a common output line 53. The output of gate 38 is connected to the record magnetic head 54 of the disc recorder 58. Similarly connected via a trio of conductors 62, 63 and 64 to three record magnetic heads 66, 67 and 68 and three read magnetic heads 70, 71 and 72 of the magnetic disc recorder 58 are the output terminals of the gate circuits 52R, 52B and 52G. The output terminal of the gate circuit 52G is also coupled to one input terminal of a matrixor 74 and the output terminals of the gates 52R and 52B are also coupled to the input terminals of a pair of delay circuits 76 and 78.

The magnetic disc recorder is shown as further comprising a circular disc 80 which rotates adjacent the recording head 54, the read head 56 displaced 60° from the record head 54, and an erase had 82 displaced 120° from the record head 54. The disc further rotates adjacent the three read heads 70, 71 and 72 displaced 60° from the record heads 66, 67 and 68 and three erase heads 84, 85 and 86 displaced 120° from the record heads 66, 67 and 68. In the specific arrangement shown, the disc 80 is rotated in synchronism with the alternately developed brightness and chroma signals, a synchronous motor (not shown) being employed to drive the disc 80.

While several different types of commercially available storage devices may be used in the present invention, including for example, magnetic tape systems, magnetic film and the like, a disc recorder is preferred. The disc being rigid, can be easily synchronized with the video signals and the unit reproduces stored information with substantially no distortion. One commercially marketed video disc recorder which may be used in the present invention is the MVR video disc recorder manufactured by Machtronics Inc. which utilizes a metallic disc having a diameter of 14 inches, a maximum storage capacity of 1600 pictures and operates at a disc speed of 600 rpm.

It is noticeable that the frame brightness signal from gate 38 is recorded on the track of the disc 80 by the head 54 during one-sixth a complete revolution by the disc such that the reproducing head 56 senses the recorded brightness signal immediately following the recordation thereof or after a delay of one-sixtieth of a second. Hence, the reproduction of the recorded brightness signal occurs concurrently with a chrominance signal subsequently developed by the camera tube 22. Similarly, the magnetic heads 66, 67 and 68 record the red, blue and green color component signals on adjacent tracks of the disc 80 during one-sixth a complete revolution by the disc. After a delay of one field scansion or one-sixtieth of a second, the read heads 70, 71 and 72 reproduce the recorded color component signals such that these signals occur simultaneously with a subsequently developed frame brightness signal Y. Accordingly, by alternately developing the frame brightness signal and the chroma signals and by alternately recording these signals for the period of one field scansion, there is produced an alignment in time between the signals.

The brightness signal Y, either transmitted directly by the gate 36 or reproduced by the head 56, is supplied to another input terminal of the matrixor 74 via line 53. Because of the time delay between the developed red, blue and green color component signals, notably 0.07 microseconds between the blue and green components and 0.14 microseconds between the red and green components, the reproduced red and blue signals are respectively delayed 0.14 microseconds and 0.07 microseconds by the delay circuits 76 and 78 before being applied to still further input terminals of the matrixor 74. In the matrixor 74, the red, blue and green color component signals are combined with the brightness signal Y, by appropriate addition and subtraction, to yield a luminance signal Y and chrominance signals I and Q in accordance with NTSC standards.

In operation, the filter disc 13, rotating at an angular velocity of 15 revolutions per second, alternately interposes the transparent segments 16 and 17 and the color strip filters 18 and 19 in the path of the incident object field light to the scanning device 22. Impressed upon the field deflection coils of the scanning yoke 24 during the time that the transparent segments 16 and 17 are placed in the path of the object field light is a high frequency sine wave which causes a corresponding sinusoidal variation in the motion of the scanning spot in the camera and the discharge of the lines of alternate odd and even fields during a field scansion. When the color strip filters 18 and 19 are interposed in the path of the incident object light, the scanning device 22 develops chroma signals which include discrete red, blue and green segments occurring at a frequency of approximately 4.72 mc/s and a square wave pilot signal occurring at a frequency of 2.36 mc/s. Accordingly, during successive field scansions, modulated frame brightness signals and chrominance signals are developed.

The brightness signal passed by gate 38 is recorded on the rotating magnetic disc 80 and the brightness signal passed by gate 36 is supplied via line 53 to the matrixor 74 for combination therein with previously developed and separated red, blue and green color component signals. After a period of one field scansion or one-sixtieth of a second, a luminance signal previously recorded by record magnetic head 54 is reproduced from the disc by the read magnetic head 56 and supplied to the matrixor 74 for combination therein with subsequently developed and separated red, blue and green color component signals.

The chrominance signal developed every other field scansion by the camera tube 22 is supplied to the chroma decoding circuit 44 wherein the color component portions of the signal are separated from the pilot signal by means of the filter 40 and the filter 42. The pilot signal, which has its frequency increased by a factor of six, advances the count of the binary counter 50 to cause the sequential enabling of the gates 52G, 52B and 52R, and accordingly, the separation of the red, blue and green color components into separate conductive paths.

The separated red, blue and green color component signals are then recorded on the magnetic disc 80 and, at the same time, supplied to the matrixor 74, the red and blue color component signals being appropriately delayed to cause these signals to occur simultaneously with the green color component signal. In the matrixor the red, blue and green color signals are combined with a previously developed luminance signal to provide a luminance signal Y and chrominance signals I and Q. After one-sixtieth of a second, the recorded red, blue and green color component signals are reproduced and supplied to the matrixor 74. In the matrixor 74, the red, blue and green signals are combined with a subsequently developed brightness signal.

Figure 2:
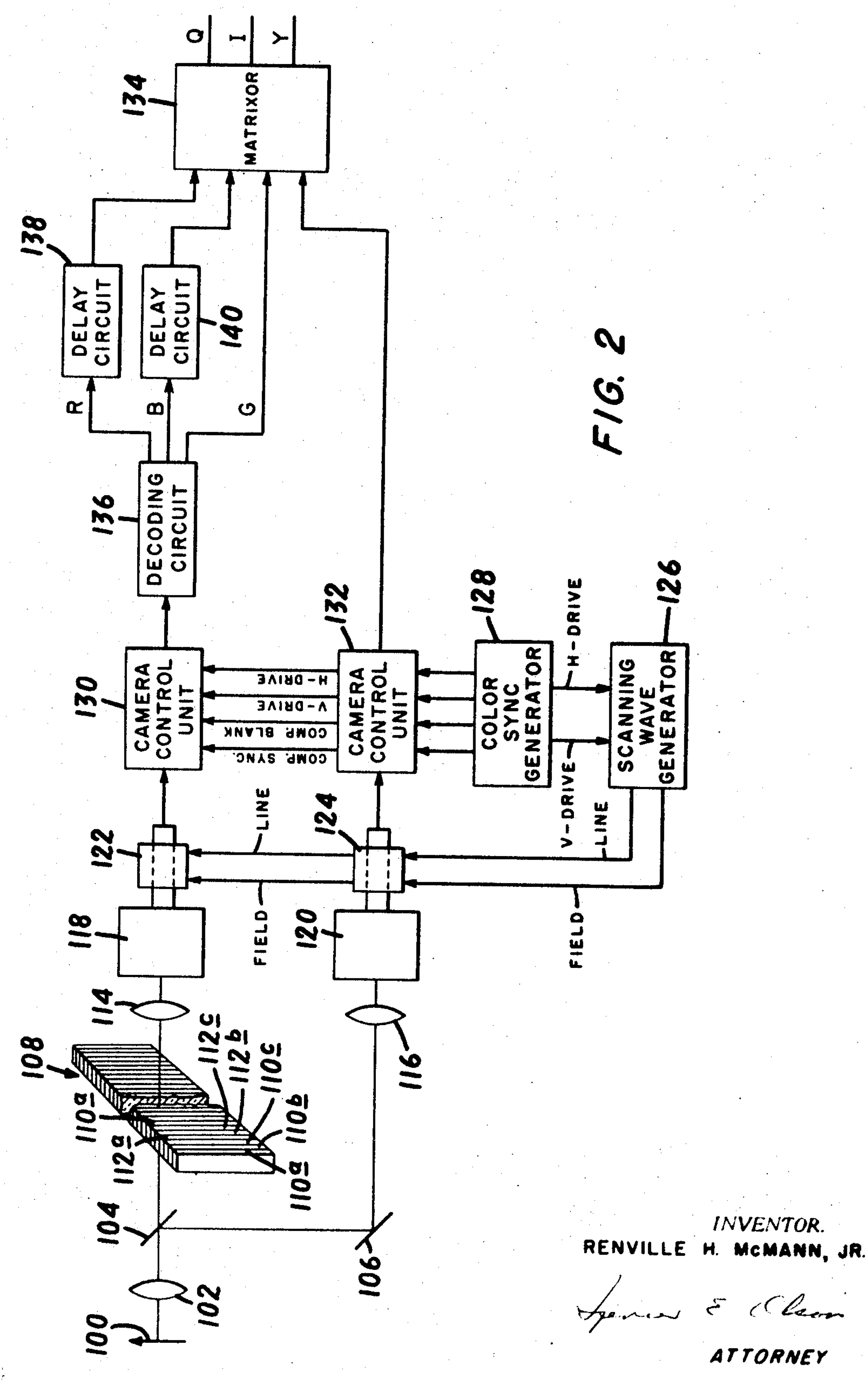
FIG. 2 is a schematic block diagram illustrating the arrangement of another embodiment of the present invention.

In a second embodiment of a representative color television system arranged according to the present invention, as shown in FIG. 2, light from an object field 100 is collected by a lens 102 and then directed along two separate paths by a conventional semi-reflecting mirror 104 and a conventional front surface mirror 106. The light transmitted by the mirror 104 is directed to a color strip filter 108 which comprises a plurality of alternately spaced fully transmissive and partially transmissive filter sets.

The fully transmissive filter sets comprise successive red, blue and green vertical filter strips **110*a*, 110*b* and 110*c* which completely and selectively transmit the red, blue and green color components of the incident object field light. The partially transmissive filter sets comprise successive red, blue and green vertical filter strips 112*a*, 112*b* and 112*c* which partially and selectively transmit the red, blue and green color components of the incident object field light. As described with reference to the embodiment shown in FIG. 1, because of the alternate spacing of the fully and partially transmissive filter sets, the intensity of the object field light transmitted by the filter sets varies between full intensity and partial intensity at a frequency which is a function of the number of filter sets and the line scansion frequency. Preferably, the color strip filter 108** comprises one hundred fifty fully transmissive filter sets and one hundred fifty partially transmissive filter sets.

The light transmitted through the color strip filter 108 and the light reflected by the surface mirror 106 are collected by a pair of cooperating relay lenses 114 and 116 which focus the transmitted light onto the light sensitive surfaces of a pair of scanning devices 118 and 120. The scanning beams in the tubes 118 and 120 are deflected in the line and field directions by suitable scanning yokes 122 and 124, respectively, which are energized simultaneously with suitable field and line scanning waves generated by a scanning wave generator 126. A color synchronizing generator 128 generates the suitable vertical and horizontal drive pulses which are supplied to the scanning wave generator 126 and to a pair of camera control units 130 and 132 associated with the camera tubes 118 and 120, respectively. The relationship between the horizontal and vertical drive pulses is selected to yield a 525-line, double-interlaced picture in accordance with conventional television systems and, more particularly, a vertical drive frequency of nominally 60 cycles and a horizontal drive frequency of 15,750 cycles. The synchronizing generator 128 also develops composite blanking and composite sync signals in the usual manner, the composite blanking and sync signals being applied to the camera control units 130 and 132 as indicated by the labelled lines.

Because of the color strip filter 108, the camera 118 generates a color field signal containing 262 ½ line portions, each line portion containing segments representative of successive 0.07 microsecond scans in the different primary color components of the object field 100. Also developed is a square wave pilot signal having a frequency which is equal to one-half the color frequency and, more particularly, a frequency of 2.36 mc/s. The camera control unit 132 in response to the signals generated by the synchronizing generator 128 and to the brightness signal produced by the camera 120 supplies a brightness signal containing 262 ½ line portions to a matrixor 134.

From the camera control unit 130, the chrominance signal is supplied to a chroma decoding circuit 136 of the type illustrated in FIG. 1 and described above. Generally, the decoding circuit 136 utilizes the square wave pilot signal to separate the red, blue and green color component signals of the chrominance signal into three separate conductive paths. The separated green color component signal is supplied directly to the matrixor 134 while the red and blue color component signals are suitably delayed by a pair of delay circuits 138 and 140 before being applied to the matrixor 134. The delay circuits 138 and 140 are provided to align in time the red and blue color component signals with the green color components signal. If necessary, a delay circuit may be used to suitably delay the brightness signal supplied from the camera control unit 132 to the matrixor 134 in order to make certain that the brightness signal is supplied to the matrixor 134 at the same time the red, blue and green color component signals are supplied to the matrixor. In the matrixor 134, the red, blue and green color component signals are combined with the brightness signal by appropriate addition and subtraction to yield a luminance signal Y and chrominance signals I and Q in accordance with the NTSC standards.

Figure 3:
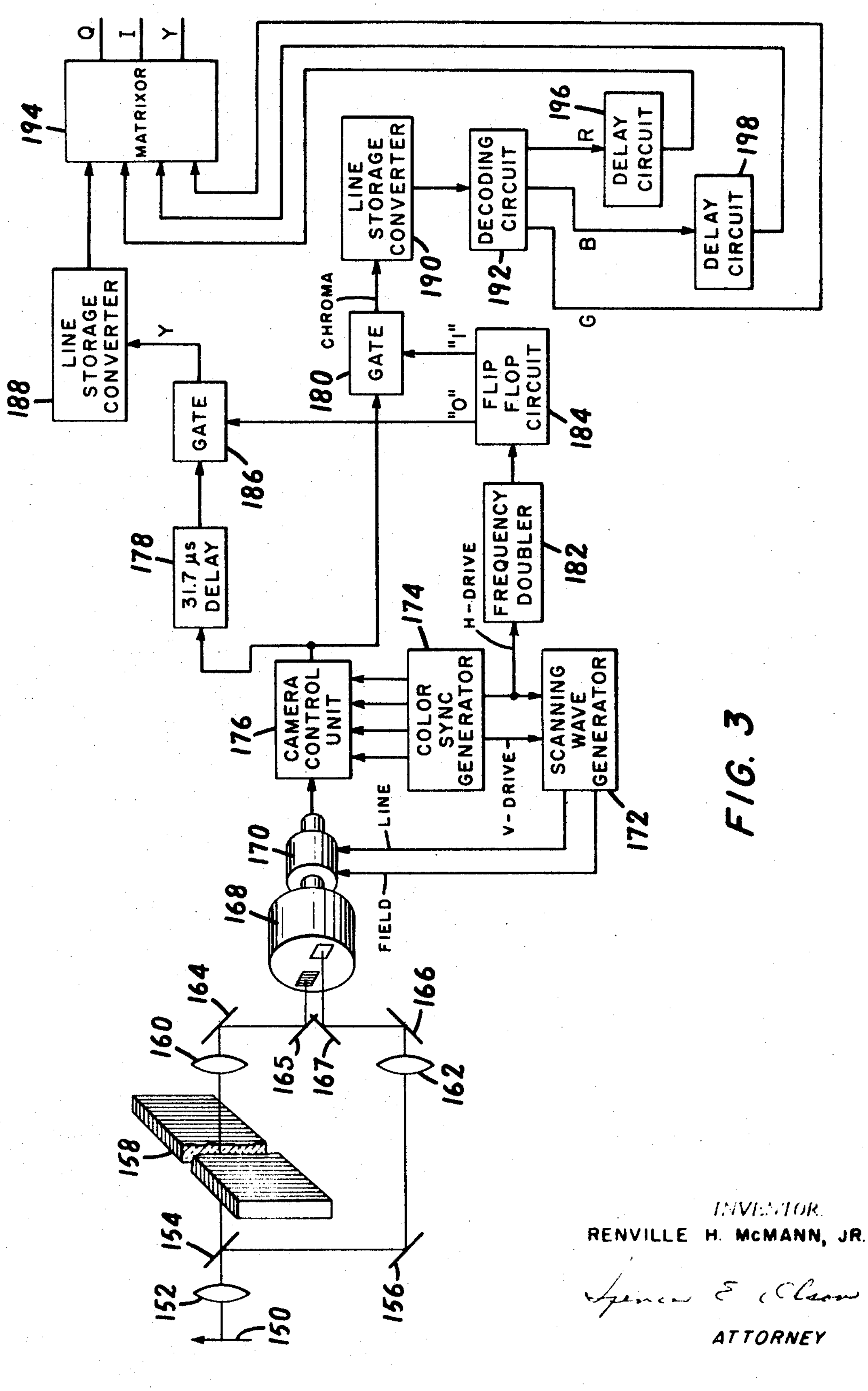
FIG. 3 is a schematic block diagram illustrating the arrangement of still another embodiment of the present invention.

In still another embodiment of a representative color television system arranged according to the present invention, as shown in FIG. 3, light from an object field 150 is collected by a lens 152 and then directed along two separate paths by a conventional semi-reflecting mirror 154 and a conventional front surface mirror 156. The light transmitted by the mirror 154 is passed through a color strip filter 158 of the type illustrated in FIG. 2 and described above. The light transmitted by the filter 158 and the light reflected by the mirror 156 are collected by a pair of cooperating relay lenses 160 and 162 and directed by means of two sets of front surface mirrors 164, 165 and 166, 167, respectively, onto opposite halves of the light sensitive surface of a scanning device 168.

The scanning beam in the device 168 is deflected in the line and field directions by a scanning yoke 170 energized with suitable sawtooth field and line scanning waves generated by a scanning wave generator 172. A color synchronizing generator 174 generates the suitable horizontal and vertical drive pulses which are applied to the scanning wave generator 172 and to a camera control unit 176 associated with the scanning device 168. Again, the relationship between the horizontal and vertical drive pulses is selected to yield a 525-line, double-interlaced picture in accordance with conventional television systems and, more particularly, a vertical drive frequency of nominally 60 cycles and a horizontal drive frequency of 15,750 cycles.

The synchronizing generator 174 also develops composite blanking and composite sync signals in the usual manner and supplies there signals to the camera control unit 176. The camera control unit 176, in response to the signals generated by the synchronizing generator 174 and to the television signal produced by the camera 168 supplies a color field signal containing 262 ½ line portions, one-half each line portion containing chrominance information and one-half each line portion containing brightness information. In particular, where the filter 158 comprises 150 partially transmissive filter sets, each of which is interposed between a pair of fully transmissive filter sets, each one-half line portion will contain segments representative of a [(63.5/2)/150 (3) (2)] or a 0.035 microsecond scan in a different primary color component of the object field 10. The other one-half line portion will contain brightness information. Furthermore, because of the alternate spacing of the filter sets, a square wave pilot signal having a frequency equal to one-half the color signal frequency will be developed.

The color television signals developed by the camera control unit 176 are simultaneously applied to a one-half line or 31.7 microsecond delay line 178 and to a gate circuit 180. As is apparent, the 31.7 microsecond delay line is provided to align in time the chrominance half line signals and the brightness half line signals of each line in the two conductive paths. To separate the chrominance half line portions and the luminance half line portions, a frequency doubler circuit 182 is provided and is supplied with horizontal drive pulses generated by the color sync generator 174. The circuit 182 doubles the frequency of the horizontal drive pulses and supplies the pulses to a flip-flop circuit 184 to successively enable and disable the flip-flop. The "1" side of the flip-flop circuit is connected to the enabling input terminal of the gate circuit 180, while the "0" side of the flip-flop circuit is coupled to the enabling input terminal of a gate circuit 186 having its outer input terminal connected to the output terminal of the delay circuit 178.

As is apparent, the frequency at which the flip-flop circuit 184 is driven between its 0 and 1 states is twice the line scansion frequency. Accordingly, the gate circuits 180 and 186 will be simultaneously enabled for approximately 31.7 microseconds when the flip-flop 184 is set and disabled for approximately 31.7 microseconds when the flip-flop 184 is reset. Preferably, the gates 180 and 186 are enabled when the camera tube 168 develops the chrominance half-line portions. Because of the delay circuit 178, the brightness one-half line portion will be transmitted by the gate 186 and the chrominance one-half line portion will be transmitted by the gate 180.

Because the transmitted brightness and chrominance signals contain one-half line portions, a pair of line storage converters 188 and 190 are provided to increase the pulse width of the portions composing the signals from 31.7 microseconds to 63.5 microseconds. Line storage converters are conventional and, hence, need not be described in detail herein. It suffices that such storage converters are operative to enlarge the pulse width of an applied signal without distorting the signal. From the line storage converter 190, the chrominance signals are supplied to a chroma decoding circuit 192 of the type illustrated in FIG. 1 and described above. Generally, the chroma decoding circuit 192 utilizes the square wave pilot signal having a frequency of 2.36 mc/s to separate into three conductive paths the red, blue and green color component signals of the chrominance signal. The separated green color component signal is supplied directly to a matrixor 194 while the red and blue color component signals are appropriately delayed by a pair of delay circuits 196 and 198 respectively before being supplied to the matrixor 194 to align in time the different color component signals. The brightness signal is also supplied to the matrixor 194. By suitable addition and subtraction, the red, blue and green color component signals are combined with the brightness signal in the matrixor 194 which produces a luminance signal Y and chrominance signals I and Q in accordance with NTSC standards.

Although the invention has been described herein with reference to specific embodiments, many modifications and variations therein will readily occur to those skilled in the art. All such variations and modifications are included within the intended scope of the invention as defined by the following claims.

I claim:

1. In apparatus for developing simultaneous color television signals, the combination comprising, optical filter means including a first plurality of strip filter sets having one transmissivity interposed between a second like plurality of strip filter sets having a different transmissivity, both filter sets being substantially transmissive of light, and having strips of the same colors, for selectively transmitting different color light components of an object field, the intensity of which varies cyclically along a direction perpendicular to the strips, input means responsive to the light transmitted by the optical filter means for developing a color television signal containing separable color component portions and for developing a pilot signal in response to the cyclical variation in the intensity thereof, decoding circuit means including means for separating the pilot signal from the separable color component portions of the color television signal, and means responsive to the separated pilot signal and to the separable color component portions for separating the separable color component portions.

2. Apparatus according to claim 1 wherein the input means further comprises means for developing luminance television signals corresponding to the brightness of the object field light and further comprising combining means for combining the separated color component portions with the luminance television signals.

3. Apparatus according to claim 2 wherein the optical filter means comprises a color strip filter, the color strip filter comprising a plurality of fully transmissive filter sets, each set comprising successive primary color component filter strips for completely and selectively transmitting the primary color light components of the object field, and a plurality of partially transmissive filter sets, each partially transmissive filter set interposed between a pair of fully transmissive filter sets and each set comprising successive primary color component filter strips for partially and selectively transmitting the primary color light components of the object field.

4. Apparatus according to claim 1 wherein the optical filter means further comprises means for transmitting all the object field light and wherein the input means includes means responsive to all the transmitted object field light for developing a luminance television signal corresponding to the brightness of the transmitted object field light.

5. Apparatus according to claim 1 where the optical filter means comprises a color strip filter, the color strip filter comprising a plurality of fully transmissive filter sets, each fully transmissive filter set comprising successive fully transmissive color filter strips, and a corresponding plurality of partially transmissive filter sets spaced between the fully transmissive filter sets, each partially transmissive filter set comprising successive partially transmissive color filter strips.

6. Apparatus according to claim 5 wherein the optical filter means comprises a rotatable filter disc, the filter disc comprising a pair of angularly spaced transparent segments and a pair of angularly spaced color filters interposed between the transparent segments, the first color strip filter comprising a plurality of axially spaced fully transmissive filter sets, each set comprising successive primary color component filter strips for completely and selectively transmitting the primary color light components of the object field, and the second strip filter comprising a plurality of axially spaced filter sets optically situated between the fully transmissive filter sets, each set comprising successive primary color component filter strips for partially and selectively transmitting the primary color light components of the object field light.

7. Apparatus according to claim 6 wherein the input means comprises scanning means for scanning the object field and further comprising means for rotating the filter disc at a predetermined angular velocity to alternately interpose the transparent segments and the spaced color strip filters between the object field light and the input means during successive field scansions by the scanning means.

8. Apparatus according to claim 7 wherein the scanning means comprises a light sensitive surface, a scanning beam for scanning the light sensitive surface and means for deflecting the scanning beam in the line and field directions and further comprising a source of high frequency signals operative concurrently with the interposition of the transparent segments between the scanning device and the object field light and coupled to the deflecting means for modulating the scanning beam in the vertical direction to cause the scanning beam to discharge the charge on adjacent lines of alternate even and odd fields.

9. Apparatus according to claim 7 further comprising gate means for selectively transmitting the developed luminance signals and further comprising recording means including storage means, first record means for recording the luminance signals on the storage means for a selected period of time to thereby align in time the luminance signals with the separated color component portions of subsequently developed color television signals and second record means for recording the separated color component portions of the developed color television signals on the storage means for a selected period of time to thereby align in time the separated color component portions with subsequently developed luminance signals.

10. Apparatus according to claim 9 wherein the recording means further comprises first reproduce means for reproducing the recorded luminance signal substantially concurrently with the subsequent development of a color television signal containing separable color component portions by the scanning means and second reproduce means for reproducing the recorded separated color component portions substantially concurrently with the subsequent development of a luminance signal by the scanning means.

11. Apparatus according to claim 9 further comprising means for combining the simultaneously occuring luminance signal and the separated color component portions to produce thereby a luminance signal Y and chrominance signals I and Q.

12. Apparatus according to claim 1 wherein the input means comprises a scanning device having a light sensitive surface and further comprising optical means including means for directing the selectively filtered light onto one-half the light sensitive surface of the scanning device and means for directing all the object field light onto the other one-half the light sensitive surface of the scanning device.

13. Apparatus according to claim 12 wherein the scanning device includes means for developing color television field signals, each television field signal containing line portions with one-half each line portion containing separable color component portions and a pilot signal and the other one-half each line portion representative of the brightness of the object field light.

14. Apparatus according to claim 13 further comprising means for transmitting the color television field signals along at least a pair of conductive paths, delay means for delaying for a selected period of time the signals in one of the conductive paths to thereby align in time the brightness representative one-half line portion of each line portion with the one-half line portion containing separable color component portions and the pilot signal.

15. Apparatus according to claim 14 further comprising switch means in each of the conductive paths for selectively and concurrently transmitting the brightness representative one-half line portion in one conductive path and the one-half line portion containing separable color component portions and the pilot signal.

16. Apparatus according to claim 1 further comprising delay means for delaying at least one of the separated color component portions for a selected period of time to thereby align in time the separated color component portions.

* * * * *